US008520706B2

(12) United States Patent
Tanimoto (10) Patent No.: US 8,520,706 B2
(45) Date of Patent: Aug. 27, 2013

(54) TRANSMITTING METHOD, RECEIVING METHOD, TRANSMITTING DEVICE AND RECEIVING DEVICE

(75) Inventor: Shinji Tanimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 296 days.

(21) Appl. No.: 12/865,196

(22) PCT Filed: Feb. 5, 2009

(86) PCT No.: PCT/JP2009/052347
§ 371 (c)(1),
(2), (4) Date: Jul. 29, 2010

(87) PCT Pub. No.: WO2009/104512
PCT Pub. Date: Aug. 27, 2009

(65) Prior Publication Data
US 2010/0322354 A1    Dec. 23, 2010

(30) Foreign Application Priority Data

Feb. 18, 2008    (JP) ................. 2008-035553

(51) Int. Cl.
*H04J 3/07* (2006.01)
(52) U.S. Cl.
USPC .................. 370/506; 370/509; 375/324
(58) Field of Classification Search
USPC ............ 370/280–281, 242–245, 251–251, 370/506–545, 357–388; 375/363–370, 324–337
See application file for complete search history.

(56) References Cited

U.S. PATENT DOCUMENTS

| 4,328,577 A | 5/1982 | Abbott et al. |
| 4,827,490 A | 5/1989 | Guerin |

(Continued)

FOREIGN PATENT DOCUMENTS

| CN | 1277766 A | 12/2000 |
| CN | 1489319 A | 4/2004 |

(Continued)

OTHER PUBLICATIONS

International Search Report for PCT/JP2009/052347 mailed Mar. 17, 2009.

(Continued)

*Primary Examiner* — Ricky Ngo
*Assistant Examiner* — Iqbal Zaidi (57) ABSTRACT

In current transmitting methods, an instantaneous interruption of a transmission data may occur at the time of switching a system. A sending method of the present invention is a sending method for transmitting a data string signal to a primary system and a backup system in which: a first periodic signal which becomes a reference signal and a second periodic signal with a longer cycle period than the first periodic signal are generated; a data string signal is synchronized with the first periodic signal; and the data string signal synchronized with the first periodic signal is multiplexed by a cycle period synchronized with the second periodic signal to transmit it to the primary system and the backup system. A receiving method of the present invention is a receiving method for receiving a data string signal multiplexed by a predetermined cycle period from a primary system and a backup system in which: synchronous processing of reception signals received from a primary system and a backup system is performed; processing for aligning phases of reception signals which are received from the primary system and the backup system and on which the synchronous processing has been performed with the phase of the predetermined cycle period is performed; and switching between a reception signal which is received from the primary system and on which said phase alignment processing has been performed and a reception signal which is received from the backup system and on which phase aligning processing have been performed is performed.

14 Claims, 4 Drawing Sheets

(56) References Cited

U.S. PATENT DOCUMENTS

| | | | | |
|---|---|---|---|---|
| 6,061,329 | A * | 5/2000 | Abe | 370/228 |
| 6,339,628 | B1 * | 1/2002 | Yoshida | 375/376 |
| 7,277,643 | B2 * | 10/2007 | Baba et al. | 398/155 |
| 2007/0058683 | A1 * | 3/2007 | Futami et al. | 370/516 |

FOREIGN PATENT DOCUMENTS

| | | |
|---|---|---|
| EP | 1213862 A1 | 6/2002 |
| JP | 61-247142 A | 11/1986 |
| JP | 3-38128 A | 2/1991 |
| JP | 7-38541 A | 2/1995 |
| JP | 7-221724 A | 8/1995 |
| JP | 2004015253 A | 1/2004 |
| JP | 2005198123 A | 7/2005 |
| JP | 2007201971 A | 8/2007 |

OTHER PUBLICATIONS

Chinese Office Action for CN20090104753.4 dated Sep. 21, 2012.
Japanese Office Action for JP2011-091854 mailed on Oct. 24, 2012.
Supplementary European Search Report for EP 09 71 3645 completed Jan. 11, 2011.
Chinese Office Action for CN200980104753.4 dated on Mar. 25, 2013 with English Translation.

* cited by examiner

TRANSMITTING METHOD, RECEIVING METHOD, TRANSMITTING DEVICE AND RECEIVING DEVICE

TECHNICAL FIELD

The present invention relates to a transmitting method, a receiving method, a transmitting device, a receiving device, a transmission apparatus and a transmission system for transmitting a data string signal using a plurality of systems.

BACKGROUND ART

A transmission system related to the present invention is disclosed in the patent documents 1-3.

In the patent document 1, there is described a radio communication system equipped with a function to presume propagation path conditions and select the most suitable modulation method.

The patent document 2 describes a channel switching apparatus equipped with a function to adjust a delay time difference between circuits using a delay adjusting circuit.

Further, in the patent document 3, there is described a switching circuit equipped with a function to correct an error which occurs when current data and backup data is switched each other by a selector using an error correction code.

[Patent document 1] Japanese Patent Application Laid-Open No. 2005-198123
[Patent document 2] Japanese Patent Application Laid-Open No. 07-038541
[Patent document 3] Japanese Paten Application Laid-Open No. 07-221724

DISCLOSURE OF INVENTION

Technical Problem

In a radio communication system disclosed in the patent document 1, there is a problem that an instantaneous interruption of transmission data is caused in the process of changing a modulation method. The reason is that, after a receiving end receives a notification of a modulation method change from a transmitting side, a received frame is not demodulated for a given time period.

Also, in a channel switching apparatus described in the patent document 2, there is a problem that switching without an instantaneous interruption is not possible. The reason is that data of a primary system and that of a backup system does not synchronize with each other when there is a difference between a delayed amount of a delay circuit set in advance and the delayed amount of an actual signal.

A switching circuit described in the patent document 3 has a problem that the circuit becomes complicated. The reason is that, because a switching circuit described in the patent document 3 corrects a data error which occurs in a selector at the time of switching using an error correction code, an error correction circuit is needed.

An object of the present invention is to provide a transmitting method, a receiving method, a transmitting device, a receiving device, a transmission apparatus and a transmission system of a simple structure whose transmission data is not lost by an instantaneous interruption when a primary system and a backup system are switched each other according to the transmission channel state of a transmission channel.

Solution to Problem

A transmitting method of the present invention is a transmitting method for transmitting a data string signal to a primary system and a backup system comprising the steps of: generating a first periodic signal having a predetermined cycle period and a second periodic signal having a longer cycle period than the first periodic signal; and synchronizing the data string signal with the first periodic signal, and multiplexing the data string signal which has been synchronized with the first periodic signal by a cycle period which is synchronized with the second periodic signal to transmit the multiplexed data string signal to the primary system and the backup system.

A receiving method of the present invention is a receiving method for receiving a data string signal multiplexed by a predetermined cycle period from a primary system and a backup system, comprising the steps of: performing synchronous processing of received signals received from the primary system and the backup system; performing processing for aligning each phase of received signals which are received from the primary system and the backup system and on which the synchronous processing has been performed with a phase of the predetermined cycle period respectively; and switching between a received signal which is received from the primary system and on which the phase alignment processing has been performed and a received signal which is received from the backup system and on which the phase alignment processing has been performed.

A transmitting device of the present invention is a transmitting device which transmits a data string signal to a primary system and a backup system, comprising: a reference signal generating unit for generating a first periodic signal having a predetermined cycle period and a second periodic signal having a longer cycle period than the first periodic signal; and a multiplexing unit for synchronizing the data string signal with the first periodic signal, and multiplexing the data string signal which has been synchronized with the first periodic signal by a cycle period which is synchronized with the second periodic signal to transmit the multiplexed data string signal to the primary system and the backup system.

A receiving device of the present invention is a receiving device which receives a data string signal multiplexed by a predetermined cycle period from a primary system and a backup system, comprising: a synchronous unit for performing synchronous processing of received signals received from the primary system and the backup system; and a switching unit for performing processing for aligning each phase of received signals which are received from the primary system and the backup system and on which the synchronous processing has been performed with a phase of the predetermined cycle period respectively and switching between a received signal which is received from the primary system and on which the phase alignment processing has been performed and a received signal which is received from the backup system and on which the phase alignment processing has been performed.

Advantageous Effect of Invention

The present invention provides a transmitting method, a receiving method, a transmitting device, a receiving device, a transmission apparatus and a transmission system of a simple structure whose transmission data is not lost by an instantaneous interruption when a primary system and a backup system are switched according to the state of a transmission channel.

REFERENCE SIGNS LIST

100 Radio transmission apparatus A
200 Radio transmission apparatus B
300 Transmitting device
400 Receiving device
500 Transmission channel
600 Transmission system
301 Reference signal generation circuit
302 Frame multiplexing circuit
401 Synchronization circuit
402 Switching circuit
A1, B1 Reference frame generating circuit
A2, B2 Stuffing circuit
A3, B3 Primary system frame multiplexing circuit
A4, B4 Backup system frame multiplexing circuit
A5, B5 Primary system modulation circuit
A6, B6 Backup system modulation circuit
A7, B7 Reception monitoring circuit
A8, B8 Primary system demodulator circuit
A9, B9 Backup system demodulator circuit
A10, B10 Primary system frame synchronization circuit
A11, B11 Backup system frame synchronization circuit
A12, B12 Non-instantaneous-interruption switching circuit
A13, B13 Destuffing circuit
C30, C31 Radio transmission channel

DESCRIPTION OF EMBODIMENTS

The first exemplary embodiment of the present invention will be described based on FIGS. 1 to 3.

Figure 1:
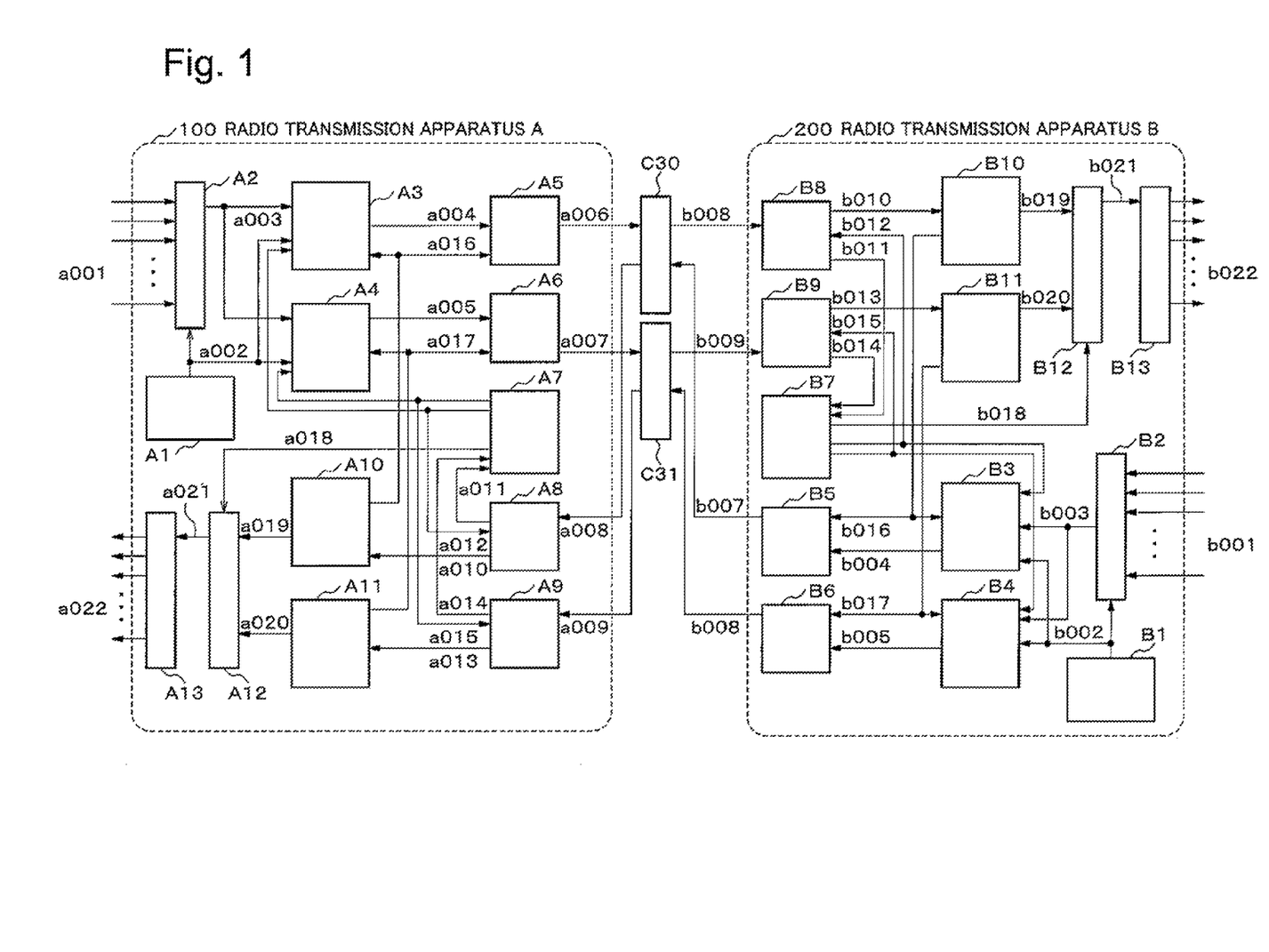
FIG. 1 is a diagram showing a structure of a radio transmission system of a first exemplary embodiment of the present invention.

FIG. 1 is a diagram showing a structure of a radio transmission system of the first exemplary embodiment of the present invention. A radio transmission system of the first exemplary embodiment is a system in which a transmitting device and a receiving device of the present invention are applied to a transmitting circuit and a receiving circuit of opposed radio transmission apparatuses. In FIG. 1, a radio transmission apparatus A 100 and a radio transmission apparatus B 200 are identical apparatuses. In description of the first exemplary embodiment, it is assumed that the radio transmission apparatus A 100 is a transmitting end (inputting side) of a PDH (Plesiochronous Digital Hierarchy) signal, and the radio transmission apparatus B 200 is a receiving end (outputted side). In the followings, the transmitting-related configuration is described using the radio transmission apparatus A 100, and the receiving-related configuration is described using the radio transmission apparatus B 200.

The radio transmission apparatus A 100 includes, as a transmitting circuit, a reference frame generating circuit A1, a stuffing circuit A2, a primary system frame multiplexing circuit A3, a backup system frame multiplexing circuit A4, a primary system modulation circuit A5 and a backup system modulation circuit A6.

The reference frame generating circuit A1 generates a reference clock (a first periodic signal) and a reference frame pulse (a second periodic signal) a002. These periodic signals provide timing which becomes the reference when generating a primary system radio frame multiplexed signal a004 and a backup system radio frame multiplexed signal a005 mentioned later. Here, the cycle period of the reference frame pulse is longer than that of the reference clock. The reference frame generating circuit A1 outputs these periodic signals to the stuffing circuit A2, the primary system frame multiplexing circuit A3 and the backup system frame multiplexing circuit A4. The reference frame generating circuit A1 is also called a reference signal generation circuit.

The stuffing circuit A2 performs stuffing synchronization processing for n received PDH data string signal a001s (n is a natural number) inputted from outside using the reference clock and the reference frame pulse a002. Then, the stuffing circuit A2 outputs n stuffing synchronization data string a003s to the primary system frame multiplexing circuit A3 and the backup system frame multiplexing circuit A4.

The primary system frame multiplexing circuit A3 operates according to the reference clock and the reference frame pulse a002, and a primary system modulation method control signal a016 transmitted from a primary system frame synchronization circuit A10 which is a transmitting-related circuit. Specifically, the n stuffing synchronization data string a003s inputted from the stuffing circuit A2 and modulation method control information is multiplexed according to a modulation method. The primary system frame multiplexing circuit A3 outputs multiplexed data as the primary system radio frame multiplexed signal a004.

The primary system modulation circuit A5 modulates the primary system radio frame multiplexed signal a004 inputted from the primary system frame multiplexing circuit A3 using a modulation method indicated by the primary system modulation method control signal a016. The primary system modulation circuit A5 transmits the modulated signal to a radio transmission channel C30 as a primary system radio transmission signal a006.

The backup system frame multiplexing circuit A4 operates according to the reference clock and the reference frame pulse a002, and a backup system modulation method control signal a017 transmitted from a backup system frame synchronization circuit A11 which is a transmitting circuit. Specifically, the n stuffing synchronization data string a003s inputted from the stuffing circuit A2 and modulation method control information is multiplexed according to a modulation method. Then, the backup system frame multiplexing circuit A4 outputs the multiplexed signal as a backup system radio frame multiplexed signal a005. Meanwhile, the frame period of the radio frame multiplexed signal of the primary system and that of the backup system are identical.

The backup system modulation circuit A6 modulates the backup system radio frame multiplexed signal a005 inputted from the backup system frame multiplexing circuit A4 using a modulation method indicated by the backup system modulation method control signal a017. Then, the backup system modulation circuit A6 transmits the modulated signal to a radio transmission channel C31 as a backup system radio transmission signal a007.

The radio transmission apparatus A100 includes, as a receiving circuit; a reception monitoring circuit A7, a primary system demodulator circuit A8, a backup system demodulator circuit A9, the primary system frame synchronization circuit A10, the backup system frame synchronization circuit A11 and a non-instantaneous-interruption switching circuit A12 and a destuffing circuit A13. The receiving circuit of the radio transmission apparatus A100 is of a structure identical with that of the receiving circuit of the radio transmission apparatus B200 mentioned later. Therefore, description of the receiving circuit will be provided in the description of the receiving circuit of the radio transmission apparatus B200.

The radio transmission apparatus B200 includes, as a transmitting circuit, a reference frame generating circuit B1, a stuffing circuit B2, a primary system frame multiplexing circuit B3, a backup system frame multiplexing circuit B4, a primary system modulation circuit B5 and a backup system modulation circuit B6. Because the transmitting circuit of the radio transmission apparatus B200 is of a structure identical with that of the transmitting circuit of the radio transmission apparatus A100 which has been already described, description will be omitted.

The radio transmission apparatus B200 includes, as a receiving circuit, a reception monitoring circuit B7, a primary system demodulator circuit B8, a backup system demodulator circuit B9, a primary system frame synchronization circuit B10, a backup system frame synchronization circuit B11, a non-instantaneous-interruption switching circuit B12 and a destuffing circuit B13.

The primary system demodulator circuit B8 measures a reception level of a primary system received signal b008 inputted from the radio transmission apparatus A100 via the radio transmission channel C30. Then, the primary system demodulator circuit B8 outputs a primary system reception level monitor signal b011 including information on the measured reception level to the reception monitoring circuit B7. The primary system demodulator circuit B8 changes a demodulation method of the primary system according to a primary system demodulation method control signal b012 inputted from the reception monitoring circuit B7. Then, the primary system demodulator circuit B8 outputs a primary system demodulated signal b010 to the primary system frame synchronization circuit B10.

The primary system frame synchronization circuit B10 performs synchronous detection of a radio frame of the primary system demodulated signal b010. The primary system frame synchronization circuit B10 outputs a primary system radio frame data string b019 to the non-instantaneous-interruption switching circuit B12. The primary system frame synchronization circuit B10 extracts the modulation method control information multiplexed into a primary system radio frame multiplexed signal a004 by the primary system frame multiplexing circuit A3 of the radio transmission apparatus A 100. Then, the primary system frame synchronization circuit B10 outputs a primary system modulation method control signal b016 to the primary system frame multiplexing circuit B3 and the primary system modulation circuit B5.

Because the backup system demodulator circuit B9 and the backup system frame synchronization circuit B11 are of the same structures as the primary system demodulator circuit B8 and the primary system frame synchronization circuit B10 respectively, description about the backup system will be omitted.

The reception monitoring circuit B7 determines channel states of the radio transmission channel C30 and the radio transmission channel C31 from the primary system reception monitor signal b011 and a backup system reception monitor signal b014. Then, the reception monitoring circuit B7 outputs the primary system demodulation method control signal b012 to the primary system demodulator circuit B8 and the primary system frame multiplexing circuit B3. The reception monitoring circuit B7 also outputs a backup system demodulation method control signal b015 to the backup system demodulator circuit B9 and the backup system frame multiplexing circuit B4. The reception monitoring circuit B7 further outputs a switching control signal b018 to the non-instantaneous-interruption switching circuit B12.

The non-instantaneous-interruption switching circuit B12 has a memory for aligning the phases of inputted frames. The non-instantaneous-interruption switching circuit B12 performs channel switching between the primary system radio frame data string b019 and a backup system radio frame data string b020 according to the switching control signal b018. The non-instantaneous-interruption switching circuit B12 outputs radio frame data after the switching to the destuffing circuit B13 as a radio frame data string b021.

The destuffing circuit B13 extracts a transmission PDH data string signal b022 from a radio frame data string b021 using destuffing processing. Then, the destuffing circuit B13 outputs the transmission PDH data string signal b022 to outside.

By such structure, a radio transmission system of the first exemplary embodiment of the present invention decreases loss of transmission data in the process of changing a modulation method according to the transmission channel state of a radio transmission channel.

Next, operation of a radio transmission system of the first exemplary embodiment will be described using FIG. 1 and FIG. 2.

In the first exemplary embodiment, it is assumed that the number of the received PDH data string signal a001s inputted from outside is four (n=4). Here, when a modulation method is QPSK (Quadrature Phase Shift Keying), two received PDH data string signals among these four received PDH data string signals are transmitted. When a modulation method is 16QAM (Quadrature Amplitude Modulation), all four received PDH data string signals are transmitted. In the following description, this structure is taken as a premise. In a radio transmission system of this exemplary embodiment, it is supposed that the symbol frequency in each modulation method is identical. Therefore, the radio transmission capacity by 16QAM will be two times of the radio transmission capacity by QPSK.

Figure 2:
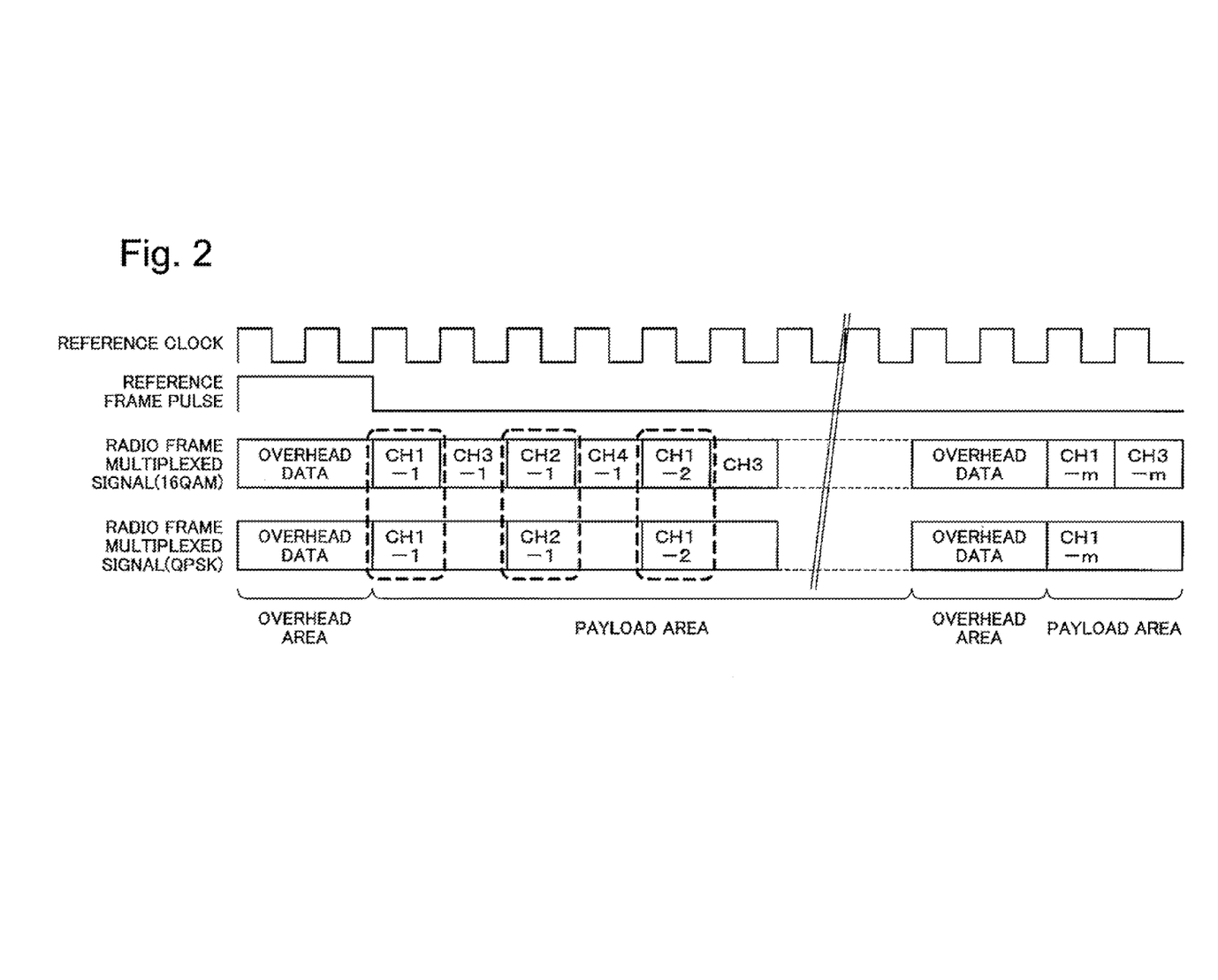
FIG. 2 is a timing chart used for description of operation of the first exemplary embodiment of the present invention.

FIG. 2 is a timing chart used for description of operation of the first exemplary embodiment.

In FIG. 2, both of the primary system radio frame multiplexed signal a004 and the backup system radio frame multiplexed signal a005 are described as a radio frame multiplexed signal. As shown in FIG. 2, a radio frame multiplexed signal includes an overhead area and a payload area.

A radio frame multiplexed signal synchronizes with a reference clock and a reference frame pulse. The synchronization timing of a radio frame multiplexed signal is identical regardless of a modulation method.

The overhead area of a radio frame multiplexed signal contains overhead data. Overhead data includes a frame bit for establishing frame synchronization and a warning transfer bit or the like to an opposed station. Into the payload area, when a modulation method is QPSK, two stuffing synchronization data strings among the aforementioned four stuffing synchronization data strings are time-division multiplexed in time with the phase of the reference frame pulse. Similarly, when a modulation method is 16QAM, all four stuffing synchronization data strings are time-division multiplexed in time with the phase of the reference frame pulse.

In the first exemplary embodiment, a radio transmission system operates as follows using synchronized radio frame multiplexed signals regardless of a modulation method.

The reference frame generating circuit A1 of the radio transmission apparatus A100 generates the reference clock and the reference frame pulse a002 which become the references of the primary system radio frame multiplexed signal a004 and the backup system radio frame multiplexed signal a005. Then, the reference frame generating circuit A1 outputs the reference clock and the reference frame pulse a002 to the stuffing circuit A2, the primary system frame multiplexing circuit A3 and the backup system frame multiplexing circuit A4.

The stuffing circuit A2 performs stuffing synchronization processing to four received PDH data string signal a001s inputted from outside using the reference clock. Then, the stuffing circuit A2 outputs four stuffing synchronization data string a003s after stuffing synchronization processing to the primary system frame multiplexing circuit A3 and the backup system frame multiplexing circuit A4.

The primary system frame multiplexing circuit A3 generates the primary system radio frame multiplexed signal a004 from the stuffing synchronization data string a003s according to the above-mentioned reference clock and the reference frame pulse a002. Meanwhile, a modulation method is designated by a modulation method control signal mentioned later.

The primary system modulation circuit A5 modulates the primary system radio frame multiplexed signal a004 using the modulation method which has been designated by the primary system modulation method control signal a016 mentioned later. Then, the modulated signal is transmitted to the radio transmission line C30 as the primary system radio signal a006.

Because the operation of the backup system frame multiplexing circuit A4 and the backup system modulation circuit A6 is identical with those of the primary system frame multiplexing circuit A3 and the primary system modulation circuit A5, the description will be omitted.

Radio signals of the primary system and the backup system propagate through the radio transmission channel C30 and C31, respectively. Meanwhile, due to fading or the like, a radio transmission channel has a temporal and spatial influence on a radio signal.

The primary system demodulator circuit B8 of the radio transmission apparatus B200 receives the primary system radio received signal b008 via the transmission channel C30. On this occasion, the primary system demodulator circuit B8 measures the reception level of the primary system radio received signal b008. Then, the primary system demodulator circuit B8 outputs the primary system reception level monitor signal b011 to the reception monitoring circuit B7. Here, the primary system reception level monitor signal b011 includes information on a modulation method and the reception level.

The reception monitoring circuit B7 identifies the modulation method of the primary system using the primary system reception level monitor signal b011. Then, the reception monitoring circuit B7 determines a demodulation method based on the identified result. Further, the reception monitoring circuit B7 outputs the primary system demodulation method control signal b012 to the primary system demodulator circuit B8.

The primary system demodulator circuit B8 identifies the primary system demodulation method control signal b012. Then, the primary system demodulator circuit B8 demodulates the primary system radio received signal b008 according to the demodulation method of the primary system determined by the reception monitoring circuit B7. The primary system demodulator circuit B8 outputs the primary system demodulated signal b010 to the primary system frame synchronization circuit B10.

The primary system frame synchronization circuit B10 performs radio frame synchronous detection of the primary system demodulated signal b010 and establishes frame synchronization. The primary system frame synchronization circuit B10 outputs the primary system radio frame data string b019 to the non-instantaneous-interruption switching circuit B12. At the same time, the primary system frame synchronization circuit B10 extracts the modulation method control information multiplexed in the primary system radio frame multiplexed signal a004 by the primary system frame multiplexing circuit A3 of the radio transmission apparatus A 100. Then, the primary system frame synchronization circuit B10 outputs the primary system modulation method control signal b016 to the primary system frame multiplexing circuit B3 and the primary system modulation circuit B5. The primary system modulation method control signal b016 includes the extracted modulation method control information.

Since operation of the backup system demodulator circuit B9 and the backup system frame synchronization circuit B11 is the same operation as the primary system demodulator circuit B8 and the primary system frame synchronization circuit B10, description is omitted.

The non-instantaneous-interruption switching circuit B12 receives the primary system radio frame data string b019 and the backup system radio frame data string b020. The non-instantaneous-interruption switching circuit B12 aligns the both radio frame data strings to identical timing using a built-in memory. Moreover, the non-instantaneous-interruption switching circuit B12 selects one of the primary system radio frame data string b019 and the backup system radio frame data string b020 according to the switching control signal b018 inputted from the reception monitoring circuit B7. The non-instantaneous-interruption switching circuit B12 outputs the selected radio frame data string b021 to the destuffing circuit B13.

The destuffing circuit B13 extracts two or four stuffing synchronization data strings from the radio frame data string b021 according to the modulation/demodulation method of the primary system or the backup system which has been selected. Then, the destuffing circuit B13 performs destuffing synchronous processing, and outputs two or four transmission PDH data string signal b201s. Here, when the modulation/demodulation method is QPSK, two PDH data string signals are transmitted, and in the case of 16QAM, four.

Next, changing operation of a modulation method and switching operation (selection operation) of the non-instantaneous-interruption switching circuit B12 will be described in detail. It is assumed that both the threshold value of the reception level at which a primary system and a backup system are switched and the threshold value of the reception level at which each modulation method is changed is T1.

By monitoring reception levels of the radio transmission channel C30 and the radio transmission channel C31, the reception monitoring circuit B7 distinguishes the quality of the communication environment. Also, the reception monitoring circuit B7 selects an appropriate modulation method from the communication environments of both of the primary system and the backup system. The reception monitoring circuit B7 notifies the primary system demodulator circuit B8 and the backup system demodulator circuit B9 of appropriate Modulation methods selected respectively and notifies the non-instantaneous-interruption switching circuit B12 of the selected results. Further, when the communication environment of the backup system is better than that of the primary system, the reception monitoring circuit B7 informs the non-instantaneous-interruption switching circuit B12 that the backup system should be used by the switching control signal b018. Moreover, the reception monitoring circuit B7 notifies the primary system frame multiplexing circuit B3 and the backup system frame multiplexing circuit B4 of the modulation methods selected respectively.

Specifically, the reception monitoring circuit B7 distinguishes the communication environments of the radio transmission channel C30 and C31 using the primary system reception level monitor signal b011 and backup system reception level monitor signal b014. On each of the primary system reception level monitor signal b011 and the backup system reception level monitor signal b014, when the magnitude is higher than the threshold value T1, the reception monitoring circuit B7 selects the modulation method of 16QAM, and when it is lower than threshold value T1, selects QPSK. Then, the reception monitoring circuit B7 transmits the selected modulation method for each of the primary system and the backup system. That is, the reception monitoring circuit B7 notifies the primary system demodulator circuit B8 and the primary system frame multiplexing circuit B3 of the modulation method selected based on the primary system reception level monitor signal b011 using the primary system demodulation method control signal b012. The reception monitoring circuit B7 also notifies the backup system demodulator circuit B9 and the backup system frame multiplexing circuit B4 of the modulation method selected based on the backup system reception level monitor signal b014 using the backup demodulation method control signal b015. At the same time, the reception monitoring circuit B7 notifies the non-instantaneous-interruption switching circuit B12 of the selected result of a system with a better communication state as the switching control signal b018.

The primary system demodulator circuit B8 demodulates the received primary system radio received signal b008 according to the modulation/demodulation method which has been notified of from the reception monitoring circuit B7. Then, the primary system demodulator circuit B8 outputs the received signal which has been demodulated to the primary system frame synchronization circuit B10 as the primary system demodulated signal b010.

The backup system demodulator circuit B9 demodulates the received backup system radio received signal b009 according to the modulation/demodulation method which has been notified of from the reception monitoring circuit B7. The backup system demodulator circuit B9 outputs the received signal which has been demodulated to the backup system frame synchronization circuit B11 as the backup demodulated signal b013.

The primary system frame synchronization circuit B10 performs synchronous detection of the primary system demodulated signal b010 and outputs the primary system radio frame data string b019 to the non-instantaneous-interruption switching circuit B12. At the same time, the primary system frame synchronization circuit B10 extracts modulation method control information multiplexed in the primary system demodulated signal b010. Then, the primary system frame synchronization circuit B10 outputs the modulation method control information to the primary system frame multiplexing circuit B3 and the primary system modulation circuit B5 as the primary system modulation method control signal b016.

The backup system frame synchronization circuit B11 performs synchronous detection of the backup system demodulated signal b013, and outputs the backup radio frame data string b020 to the non-instantaneous-interruption switching circuit B12. At the same time, the backup system frame synchronization circuit B11 extracts modulation method control information multiplexed in the backup system demodulated signal b013. Then, the backup system frame synchronization circuit B11 outputs the modulation method control information to the backup system frame multiplexing circuit B4 and the backup system modulation circuit B6 as a backup system modulation method control signal b017.

The non-instantaneous-interruption switching circuit B12 aligns the phases between the frames of the primary radio frame data string 6019 and the backup radio frame data string b020. Then, the non-instantaneous-interruption switching circuit B12 switches the channels of the primary system radio frame data string b019 and the backup system radio frame data string b020 according to the switching control signal b018. The non-instantaneous-interruption switching circuit B12 outputs the radio frame data after switching to the destuffing circuit B13 as the radio frame data string b021.

Here, by aligning the phases between frames of the primary system radio frame data string b019 and the backup system radio frame data string b020, an instantaneous interruption which is caused by a phase difference when switching to a system or the like indicated by the switching control signal b018 can be prevented.

On the other hand, the primary system frame multiplexing circuit B3 multiplexes the modulation/demodulation method which has been notified of from the reception monitoring circuit B7 in a primary system radio frame multiplexed signal b004 as modulation method control information.

The backup system frame multiplexing circuit B4 multiplexes the modulation/demodulation method which has been notified of from the reception monitoring circuit B7 in a backup system radio frame multiplexed signal b005 to be generated as modulation method control information.

On the radio frame multiplexed signals (b004 and b005) in which modulation method control information of the respective systems has been multiplexed, modulation processing is performed by the primary system modulation circuit B5 and the backup system modulation circuit B6. Then, the radio frame multiplexed signals (b004 and b005) are transmitted to the radio transmission apparatus A 100 via the radio transmission channels (C30 and C31).

The primary system demodulator circuit A8 and the backup system demodulator circuit A9 of the radio transmission apparatus A100 receive and demodulate a primary system radio received signal a008 and a backup system radio received signal a009 in which the modulation method control information on the respective systems has been multiplexed. The primary system demodulator circuit A8 and the backup system demodulator circuit A9 notify the primary system frame synchronization circuit A10 and the backup system frame synchronization circuit A11 of a primary system demodulated signal a010 and a backup system demodulated signal a013 which have been demodulated, respectively.

The primary system frame synchronization circuit A10 and the backup system frame synchronization circuit A11 obtain information on a modulation method used by each of the systems of the radio transmission apparatus A100 from the primary system demodulated signal a010 and the backup system demodulated signal a013. Then, the primary system frame synchronization circuit A10 and the backup system frame synchronization circuit A11 output obtained information as the primary system modulation method control signal a016 and the backup system modulation method control signal a017. As a result, the primary system frame synchronization circuit A10 and the backup system frame synchronization circuit A11 designate a modulation/demodulation method of each of the systems used for radio communication from the radio transmission apparatus A 100 to the radio transmission apparatus B 200.

By such operation, a radio transmission system of the first exemplary embodiment enables switching of the systems without instantaneous interruption.

Moreover, in the first exemplary embodiment, the respective modulation methods may be changed after the aforementioned non-instantaneous-interruption switching.

Meanwhile, on the occasion of synchronous detection in the primary system frame synchronization circuit B10 and the backup system frame synchronization circuit B11, a start bit of the primary system demodulated signal b010 and the backup system demodulated signal b013 may be synchronized with the reference frame, respectively.

Also, on the occasion of synchronous detection in the primary system frame synchronization circuit B10 and the backup system frame synchronization circuit B11, synchronous processing may be performed on received signals of the primary system and the backup system using the reference clock pulse, respectively. Further, on a received signal of the primary system and the backup system, synchronous processing may be performed using the reference frame pulse which has a cycle period longer than that of the reference clock pulse.

As it has been described above, in a radio transmission system of the first exemplary embodiment of the present invention, a radio transmission apparatus performs synchronous detection of received signals of the primary system and the backup system received via radio transmission channels, respectively. The radio transmission apparatus makes it possible to switch systems in the state that the phases between the received signals of the primary system and the backup system on which synchronous detection have been performed are aligned. By composing a radio transmission apparatus thus, it is possible to prevent loss of transmission data which occurs by asynchronousness or loss of synchronization when a modulation method is changed according to the transmission channel state of a radio transmission channel.

The first exemplary embodiment has the effect that a PDH data string signal which transmits between radio transmission apparatuses is not lost when a radio modulation method is changed. The first reason is that a modulation method of a radio transmission channel of a selected system (primary system) and a non-selected system (backup system) are changed independently with each other. The second reason is that the frame period (symbol period) of a radio frame data string is the identical period for each modulation method. Moreover, the third reason is that the data phases of stuffing synchronization data strings after stuffing synchronization processing in which data is multiplexed in a payload area are the same phase.

The first exemplary embodiment also has the effect that delay of data can be suppressed. The first reason is that, even if the type of modulation methods is changed at a transmission side, the frame starting positions of a radio frame multiplexed signal of the primary system and the backup system are aligned uniformly. The second reason is that a modulation method is changed using a memory which absorbs a transmission delay difference between the transmission channel of the primary system and the transmission channel of the backup system at a receiving end, while aligning starting positions of the data phases (symbol period) of a PDH data string signal after stuffing synchronization processing in which data is multiplexed in a payload area.

Further, as a modification of the first exemplary embodiment, in changing modulation methods of the primary system and the backup system, a system that is not selected at present may be given priority.

An example of operation in which a system that is not selected at present is given priority will be described. A case where the transmission channel state of the radio transmission channel C31 in which the modulation/demodulation method of the primary system is QPSK and the modulation/demodulation method of the backup system is 16QAM has been deteriorated will be considered. In this case, the non-instantaneous-interruption switching circuit B12 changes the radio frame data string b021 to be outputted from the backup radio frame data string b019 to the primary radio frame data string b020.

The modulation and demodulation method of a backup system is 16QAM. The backup system transmits four transmission PDH data string signals during four reference clocks. On the other hand, the modulation/demodulation method of the primary system is QPSK. The primary system transmits two PDH data string signals. Like the timing chart shown in FIG. 2, two of stuffing synchronization data string CH1 and CH2 after a stuffing synchronization processing are assigned to a same phase being synchronized with the reference frame pulse. For this reason, there is no phase difference between generated frames even when the transmission channels are different and modulation methods are different. This is the effect of a memory which aligns phases provided in the non-instantaneous-interruption switching circuit B12. Thus, because there are no phase differences between the frame, it is possible to switch between the primary system and the backup system without an instantaneous interruption.

When the modulation/demodulation method of the backup system is changed to QPSK from 16QAM by the same operation as the primary system after switching of a radio frame data string, both the modulation/demodulation method of the primary system and that of the backup system becomes QPSK.

After that, when the reception level of the transmission channel has been improved, first, the modulation circuit of a system that is not selected changes its modulation method to the modulation method of 16QAM from QPSK. Next, the non-instantaneous-interruption switching circuit B12 changes a system to be selected. As a result, the number of transmission of PDH data string signals increases to four from two. Also, it becomes possible to transmit two PDH data string signals which have been being transmitted by the modulation method of QPSK without instantaneous interruption.

In the above-mentioned first exemplary embodiment and its modification, a radio transmission apparatus which performs a modulation method change between 16QAM and QPSK has been described. However, the present invention is also applicable similarly to multilevel modulation methods of 32QAM or beyond.

Next, another modification of the first exemplary embodiment will be described. Also in changing between no smaller than three kinds of modulation method, a transmission apparatus of the present invention can change a modulation method without causing instantaneous interruption of a certain number of PDH data string signals.

Figure 3:
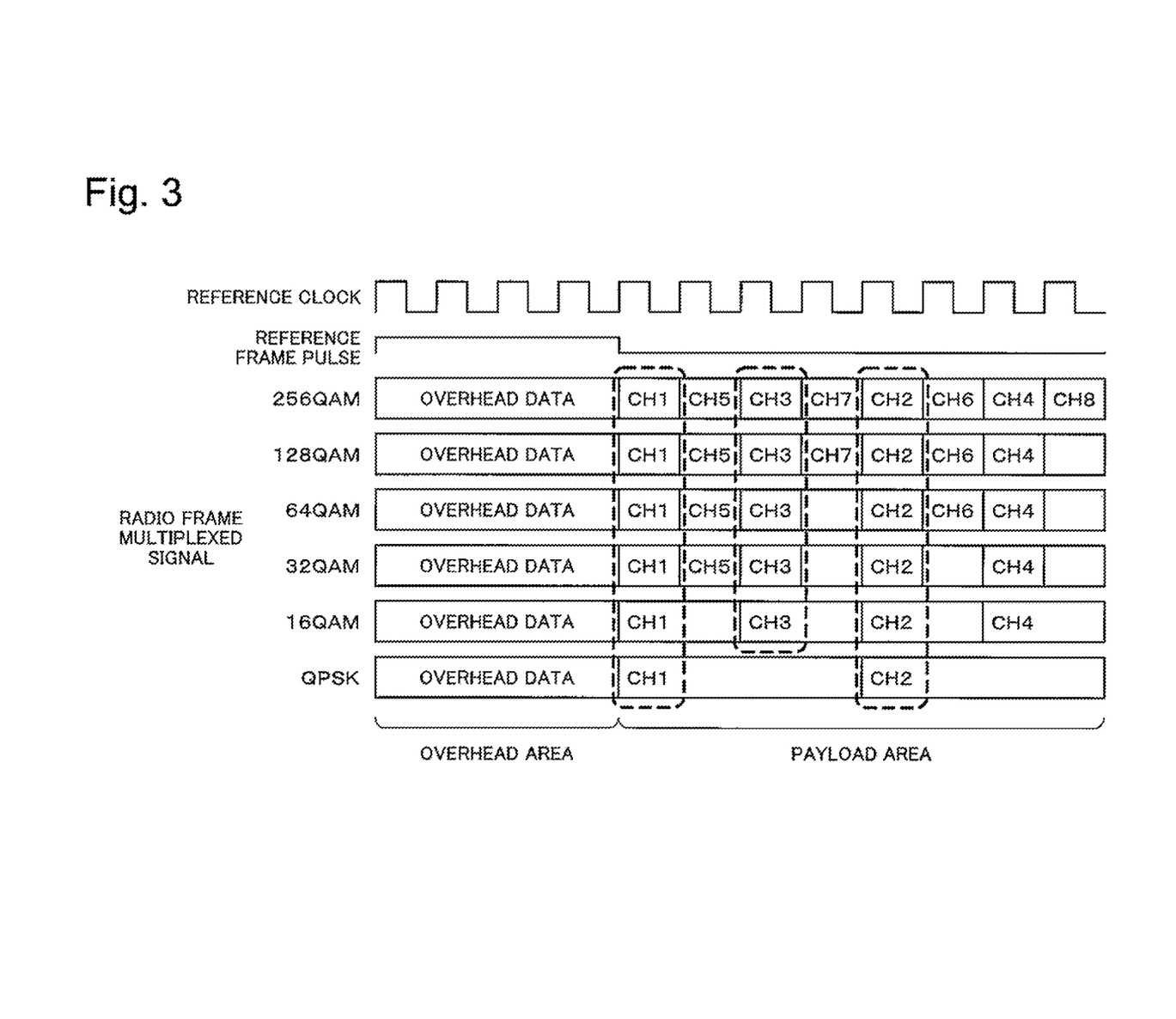
FIG. 3 is a timing chart illustrating synchronization timing of each modulation method.

FIG. 3 is a timing chart showing synchronization timing in a plurality of modulation methods.

When it is assumed that the symbol frequencies (symbol periods) of the respective modulation methods are the same, 16QAM has a transmission capacity of two times as large as that of QPSK. Similarly, 32QAM has a transmission capacity of 2.5 times, 64QAM has that of 3 times, 128QAM has that of 3.5 times and 256QAM has that of 4 times as large as that of QPSK.

In FIG. 3A, there is illustrated a case where a modulation method is QPSK and a frame multiplexed signal which transmits two PDH data string signals is generated. In the timing chart of FIG. 3, it is possible to assign four PDH data string signals in 16QAM, five in 32QAM, six in 64QAM, seven in 128QAM and eight in 256QAM, respectively.

As mentioned above, when the modulation methods of the primary system and the backup system are different, a radio transmission system of the first exemplary embodiment aligns stuffing synchronization data strings after stuffing synchronization processing to the same phase with the reference frame pulse. As a result, frame phases of a primary system transmission channel and a backup system transmission channel becomes identical. Thus, by making the frame phases of the primary system transmission channel and the backup system transmission channel identical, an instantaneous interruption of a PDH data string signal at the time of switching the primary system and the backup system can be prevented.

In this way, a radio transmission system of the first exemplary embodiment guarantees continuity of each stuffing synchronization data string multiplexed in a frame data string at the time of switching a system.

Moreover, a radio transmission system of the first exemplary embodiment guarantees continuity of each stuffing synchronization data string by not selecting a system that is executing modulation method change control. As a result, an instantaneous interruption of data transmission which occurs at the time of switching between the primary system and the backup system and at the time of changing a modulation method is prevented.

Meanwhile, according to the first exemplary embodiment mentioned above, it is assumed that the number of primary systems is one, and the number of backup systems is one. However, the number of primary systems and that of backup systems do not need to be limited to one. It may be arranged such that there are a plurality of primary systems and one backup system, and that there are a plurality of primary systems and a plurality of backup systems. Also in such cases, an instantaneous interruption at the time of switching systems can be prevented by having a similar structure and performing similar operation.

Figure 4:
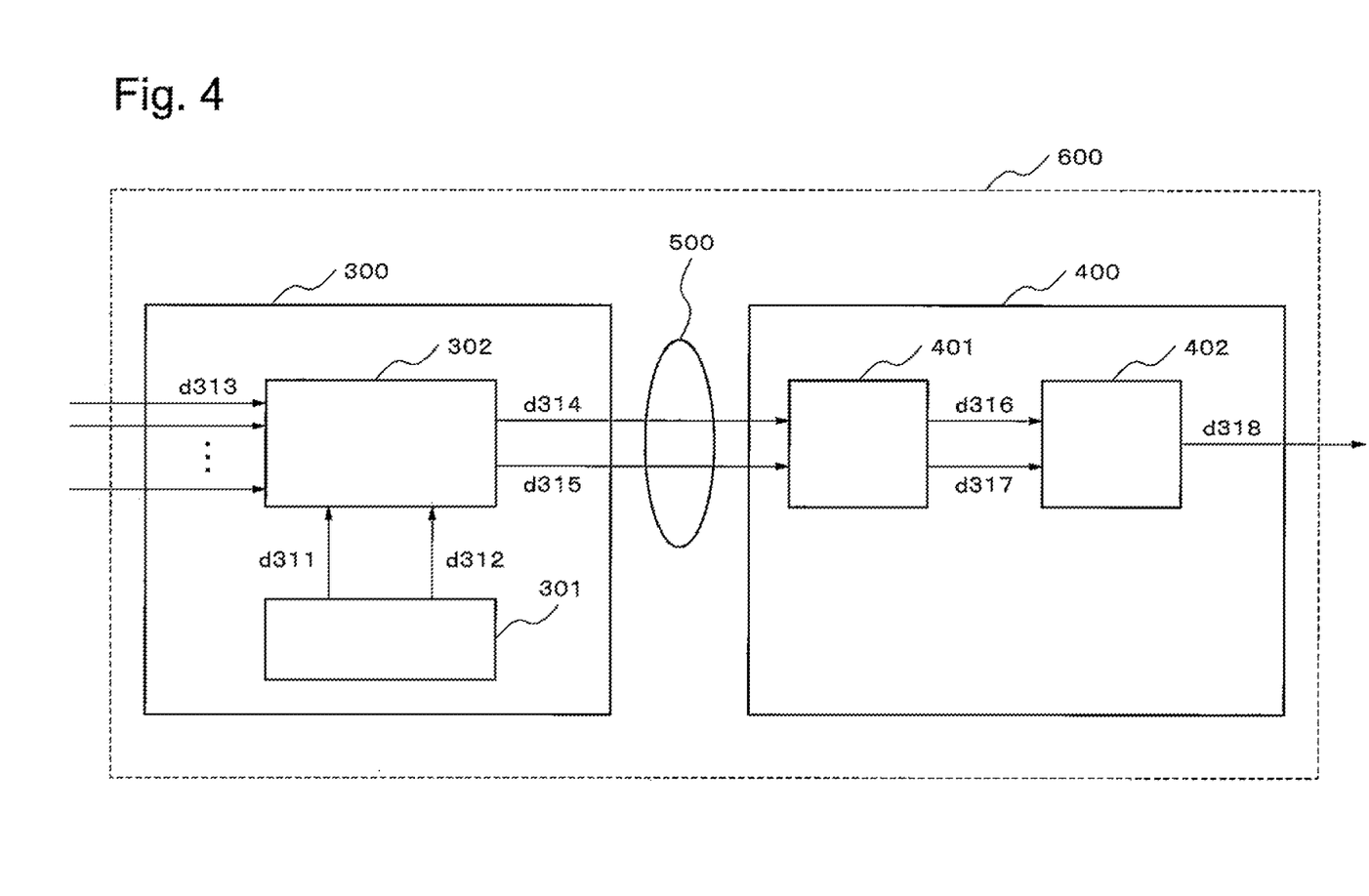
FIG. 4 is a block diagram showing a transmission system of a second exemplary embodiment of the present invention.

FIG. 4 is a block diagram showing a transmission system of the second exemplary embodiment of the present invention. In the second exemplary embodiment, a transmission system 600 is of a structure in which a transmitting device 300 and a receiving device 400 face via a transmission channel 500.

The transmitting device 300 includes a reference signal generation circuit 301 which generates a first periodic signal d311 that becomes a reference signal and a second periodic signal d312 having a cycle period longer than that of the first periodic signal. The transmitting device 300 also includes a frame multiplexing circuit 302. The frame multiplexing circuit 302 multiplexes an inputted data string signal d313 as a primary system frame multiplexed signal d314 and a backup system frame multiplexed signal d315.

In this structure, the frame multiplexing circuit 302 performs synchronous processing to the inputted data string signal d313 using the first periodic signal d311 and the second periodic signal d312.

Then, the frame multiplexing circuit 302 outputs the primary system frame multiplexed signal d314 and the backup system frame multiplexed signal d315 which are synchronized with the first periodic signal d311 and the second periodic signal d312.

The opposed receiving device 400 receives the primary system frame multiplexed signal d314 and the backup system frame multiplexed signal d315 which the transmitting device 300 has transmitted.

A synchronization circuit 401 of the receiving device 400 performs synchronous processing of the primary system frame multiplexed signal d314 and the backup system frame multiplexed signal d315 which have been received. Then, a primary system frame multiplexed signal d316 and a backup system frame multiplexed signal d317 to which synchronous processing has been performed are transmitted to a switching circuit 402.

The switching circuit 402 selects one of the primary system frame multiplexed signal d316 and the backup system frame multiplexed signal d317 and outputs it as an output signal d318.

Further, the switching circuit 402 is equipped with a function to make the phases between the frames of the inputted primary system frame multiplexed signal d316 and the backup system frame multiplexed signal d317 aligned As a result, even if the switching circuit 402 switches an output signal d318 to be outputted from the primary system frame multiplexed signal d316 to the backup system frame multiplexed signal d317, there are no cases that a received signal is lost due to a phase difference.

Thus, the second exemplary embodiment of the present invention shown in FIG. 4 also has the effect that an instantaneous interruption of data at the time of switching a system can be prevented.

As above, the present invention has been described with reference to the exemplary embodiments. However, the present invention is not limited to the above-mentioned exemplary embodiments. Various modifications to the composition and the details of the present invention which a person skilled in the art can understand can be made in the scope of the present invention.

This application is the National Phase of PCT/JP2009/052347, filed Feb. 5, 2009, which claims priority based on Japanese Patent Application No. 2008-035553 filed on Feb. 18, 2008, the disclosure of which is incorporated herein in its entirety by reference.

The invention claimed is:

1. A transmitting and receiving method for transmitting a data string signal to a primary system and a backup system and for receiving the data string signal multiplexed by a predetermined cycle period from the primary system and the backup system, comprising the steps of:

generating a first periodic signal having a predetermined cycle period and a second periodic signal having a longer cycle period than said first periodic signal; and synchronizing said data string signal with said first periodic signal, and multiplexing said data string signal which has been synchronized with said first periodic signal by a cycle period which is synchronized with said second periodic signal to transmit said multiplexed data string signal to said primary system and said backup system;

performing synchronous processing of received signals received from said primary system and said backup system;

performing processing for aligning each phase of received signals which are received from said primary system and said backup system and on which said synchronous processing has been performed with a phase of said predetermined cycle period respectively; and switching between a received signal which is received from said primary system and on which said phase alignment processing has been performed and a received signal which is received from said backup system and on which said phase alignment processing has been performed, wherein said synchronous processing is synchronous processing for synchronizing received signals received from said primary system and said backup system with a first periodic signal individually and synchronizing received signals of said primary system and said backup system which have been synchronized with said first periodic signal with a second periodic signal having a longer cycle period than said first periodic signal individually, and wherein said synchronous processing with said second periodic signal synchronizes positions of an overhead area and a payload area of a received signal.

2. The transmitting and receiving method according to claim 1, wherein frame multiplexed signals of said primary system and said backup system are modulated respectively using a predetermined modulation method.

3. A receiving method for receiving a data string signal multiplexed by a predetermined cycle period from a primary system and a backup system, comprising the steps of:

performing synchronous processing of received signals received from said primary system and said backup system;

performing processing for aligning each phase of received signals which are received from said primary system and said backup system and on which said synchronous processing has been performed with a phase of said predetermined cycle period respectively; and switching between a received signal which is received from said primary system and on which said phase alignment processing has been performed and a received signal which is received from said backup system and on which said phase alignment processing has been performed, wherein said synchronous processing is synchronous processing for synchronizing received signals received from said primary system and said backup system with a first periodic signal individually and synchronizing received signals of said primary system and said backup system which have been synchronized with said first periodic signal with a second periodic signal having a longer cycle period than said first periodic signal individually, and wherein said synchronous processing with said second periodic signal synchronizes positions of an overhead area and a payload area of a received signal.

4. The receiving method according to claim 3, wherein said synchronous processing is frame synchronization processing performed using a start bit of said received signals.

5. The receiving method according to claim 3, wherein said synchronous processing with said second periodic signal synchronizes positions of an overhead area and a payload area of a received signal and also synchronizes various signal strings assigned to a payload area with said first periodic signal.

6. The receiving method according to claim 3, wherein a communication environment of a transmission line is monitored for each system, and a demodulation method is selected for each of said primary system and said backup system based on said monitoring result; wherein received signals of said primary system and said backup system are demodulated using said selected demodulation method; wherein a switching signal is generated based on a monitoring result for each system; and wherein said switching is performed based on said switching signal.

7. The receiving method according to claim 6, wherein said demodulation method is selected from demodulation methods having an identical symbol frequency according to a state of said communication environment for each system.

8. A transmitting and receiving system which includes a transmitting device which transmits a data string signal to a primary system and a backup system and a receiving device which receives a data string signal multiplexed by a predetermined cycle period from a primary system and a backup system, the transmitting device comprising:

a reference signal generating unit for generating a first periodic signal having a predetermined cycle period and a second periodic signal having a longer cycle period than said first periodic signal; and a multiplexing unit for synchronizing said data string signal with said first periodic signal, and multiplexing said data string signal which has been synchronized with said first periodic signal by a cycle period which is synchronized with said second periodic signal to transmit said multiplexed data string signal to said primary system and said backup system, and the receiving device comprising:

a synchronous unit for performing synchronous processing of received signals received from said primary system and said backup system; and a switching unit for performing processing for aligning each phase of received signals which are received from said primary system and said backup system and on which said synchronous processing has been performed with a phase of said predetermined cycle period respectively and switching between a received signal which is received from said primary system and on which said phase alignment processing has been performed and a received signal which is received from said backup system and on which said phase alignment processing has been performed, wherein said synchronous unit synchronizes received signals received from said primary system and said backup system with a first periodic signal individually and synchronizes received signals of said primary system and said backup system which have been synchronized with said first periodic signal with a second periodic signal having a longer cycle period than said first periodic signal individually, and wherein said synchronous unit synchronizes positions of an overhead area and a payload area of a received signal using said second periodic signal.

9. The transmitting and receiving system according to claim 8, the transmitting device further comprising a modulation unit for modulating frame multiplexed signals of said primary system and said backup system respectively using a predetermined modulation method.

10. A receiving device which receives a data string signal multiplexed by a predetermined cycle period from a primary system and a backup system, comprising:

a synchronous unit for performing synchronous processing of received signals received from said primary system and said backup system; and a switching unit for performing processing for aligning each phase of received signals which are received from said primary system and said backup system and on which said synchronous processing has been performed with a phase of said predetermined cycle period respectively and switching between a received signal which is received from said primary system and on which said phase alignment processing has been performed and a received signal which is received from said backup system and on which said phase alignment processing has been performed, wherein said synchronous unit synchronizes received signals received from said primary system and said backup system with a first periodic signal individually and synchronizes received signals of said primary system and said backup system which have been synchronized with said first periodic signal with a second periodic signal having a longer cycle period than said first periodic signal individually, and wherein said synchronous unit synchronizes positions of an overhead area and a payload area of a received signal using said second periodic signal.

11. The receiving device according to claim 10, wherein said synchronous unit performs frame synchronization processing performed using a start bit of said received signals.

12. The receiving device according to claim 10, wherein said synchronous unit synchronizes, using said second periodic signal, positions of an overhead area and a payload area of a received signal and also synchronizes various signal strings assigned to a payload area with said first periodic signal.

13. The receiving device according to claim 10, further comprising:

a monitoring unit for monitoring a communication environment of a transmission line for each system, and selecting a demodulation method for each of said primary system and said backup system based on said monitoring result; and a demodulation unit for demodulating received signals of said primary system and said backup system using said selected demodulation method, wherein said monitoring unit generates a switching signal for switching said primary system and said backup system based on said monitoring result; and wherein said switching unit is controlled based on said switching signal.

14. The receiving device according to claim 13, wherein said monitoring unit selects said demodulation method from demodulation methods having an identical symbol frequency according to a state of said communication environment of each system.

* * * * *